US 7,142,122 B2

(12) United States Patent
Butikofer et al.

(10) Patent No.: US 7,142,122 B2
(45) Date of Patent: Nov. 28, 2006

(54) DEVICE INITIALIZATION IN RESPONSE TO A REMOTE EVENT

(75) Inventors: Chet Butikofer, Meridian, ID (US); Robert W. Jewell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 566 days.

(21) Appl. No.: 09/992,180

(22) Filed: Nov. 14, 2001

(65) Prior Publication Data
US 2003/0089839 A1   May 15, 2003

(51) Int. Cl.
*G08B 23/00* (2006.01)

(52) U.S. Cl. ............... 340/573.1; 340/10.1; 340/572.2; 340/825.72; 399/70; 399/75; 400/61; 400/76

(58) Field of Classification Search ............. 340/573.1, 340/550, 551, 552, 553, 554, 555, 556, 557, 340/561, 562, 10.1, 825.69, 825.72, 5.2, 340/5.22, 5.24, 572.1, 572.2, 10.5, 10.51, 340/686.1, 686.6; 358/1.14, 1.15; 399/38, 399/70, 75, 79, 80, 81; 400/61, 63, 70, 76
See application file for complete search history.

(56) References Cited

U.S. PATENT DOCUMENTS

| | | | |
|---|---|---|---|
| 5,489,935 A | | 2/1996 | Dornier |
| 5,526,027 A | | 6/1996 | Wade et al. |
| 5,633,668 A | | 5/1997 | Schwiebert et al. |
| 5,907,742 A | | 5/1999 | Johnson et al. |
| 6,151,464 A | * | 11/2000 | Nakamura et al. ............ 399/79 |
| 6,172,762 B1 | * | 1/2001 | Uchiyama ................... 358/1.14 |
| 6,577,825 B1 | * | 6/2003 | Gonnella, Jr. et al. ........ 399/38 |
| 6,698,950 B1 | * | 3/2004 | Nishii .......................... 400/63 |

* cited by examiner

*Primary Examiner*—Davetta W. Goins

(57) ABSTRACT

Detection of a potential user of an imaging device is utilized to begin the initialization of the imaging device prior to when the user is expected to access the imaging device. By beginning the initialization process prior to the user's expected access of the device, wait time experienced by the user may be reduced without a need to continuously maintain the device in a full powered-up state or even to maintain the device in a stand-by state.

19 Claims, 2 Drawing Sheets

DEVICE INITIALIZATION IN RESPONSE TO A REMOTE EVENT

TECHNICAL FIELD OF THE INVENTION

The present invention relates generally to networks containing imaging devices, and in particular to methods and apparatus for initializing imaging devices in response to a remote event.

BACKGROUND OF THE INVENTION

Scanners, copiers, laser printers, thermal printers and other such imaging devices are common in a typical office network. Many of these imaging devices require long initialization periods before they are capable of producing images at a desired quality level. For example, a scanner or copier may have to warm up a fluorescent bulb used in the scan process before it is able to reliably perform a scan, or a laser printer may have to warm up a fuser element used to set the toner before it is able to form a permanent image. These initialization periods are often a nuisance to users who may want an image immediately. For example, a person coming in to work may find that their copier or printer is turned off when they try to prepare some last minute materials for a meeting. If the person is running late for the meeting, a wait of 5 minutes or more for the initialization of the imaging device may seem like an eternity.

One approach used to minimize the impact on the user is to leave an imaging device continuously powered up. While this avoids the routine initialization period, it can also lead to a reduced life of the imaging device as well as an unnecessary waste of power. Another approach is to place the imaging device in a stand-by or hibernation state during periods of extended inactivity. During stand-by, the imaging device remains at an intermediate temperature between that of a full "off" state to a full "on" state. The device is typically brought out of its stand-by state in response to data input from a user of the device, e.g., a print job sent to a printer or a user pressing the power button on an operating panel of the device. While a stand-by state reduces the power requirements compared to leaving the device fully powered up, there is still some wait for the user while the device transitions from its intermediate temperature to its full operating temperature.

For the reasons stated above, and for other reasons stated below that will become apparent to those skilled in the art upon reading and understanding the present specification, there is a need in the art for alternative methods and apparatus for improving response times of imaging devices.

SUMMARY

Methods and apparatus for initializing imaging devices in response to a remote event are described herein. Detection of a potential user of an imaging device is utilized to begin the device initialization prior to when the user might be expected to access the imaging device. By beginning the initialization process prior to the user's expected access of the device, wait time experienced by the user may be reduced without a need to continuously maintain the device in a full powered-up state or even to maintain the device in a stand-by state.

For one embodiment, the invention provides a method of preparing an imaging device for use. The method includes detecting a potential user of the imaging device and beginning an initialization of the imaging device in response, at least in part, to detecting the potential user. The initialization of the imaging device is begun without communication from the potential user to the imaging device.

For another embodiment, the invention provides a system. The system includes a network, at least one imaging device in communication with the network and at least one sensor in communication with the network and adapted to detect a potential user of one or more of the imaging devices. The system further includes a management facility in communication with the network, the at least one imaging device and the at least one sensor. The management facility is adapted to initialize one or more of the imaging devices in response to a predefined criteria. The predefined criteria includes at least whether a sensor indicates detection of a potential user.

For yet another embodiment, the invention provides a computer-usable media having computer-readable instructions stored thereon capable of causing a processor to perform a method. The method includes receiving a first signal indicative of a presence of a potential user of an imaging device, determining whether the potential user of the imaging device is a likely user of the imaging device, and providing a second signal directed to the imaging device and adapted to begin an initialization of the imaging device if it is determined that the potential user is a likely user.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments of the invention facilitate initializing imaging devices in response to a remote event, such as detecting the approach or presence of a potential user of an imaging device. Detection of a potential user of an imaging device is utilized to begin the device initialization prior to the user being able to access the imaging device. By beginning the initialization process prior to the user being able to access the device, wait time experienced by the user may be reduced without a need to continuously maintain the device in a full powered-up state or even to maintain the device in a stand-by state. As used herein, detecting a potential user does not involve direct communication between the potential user and an imaging device such as a user sending a print job to an imaging device or a user pressing a button on a control panel of the imaging device.

Figure 1:
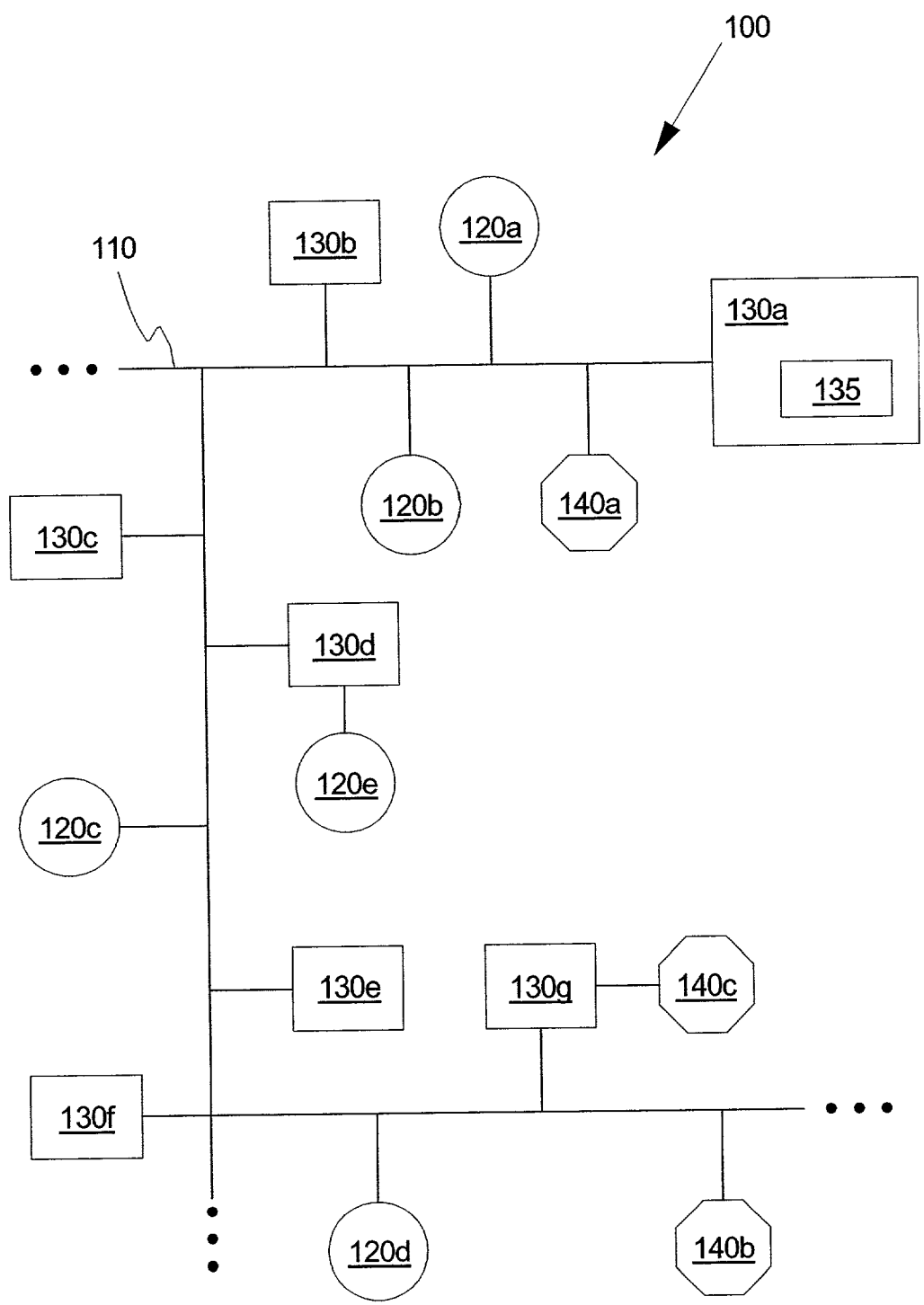
FIG. 1 is a schematic of a system having a network of imaging devices and access devices in accordance with an embodiment of the invention.

FIG. 1 is a schematic of a system 100 having a network 110, one or more imaging devices 120 in communication with the network and one or more access devices 130 in communication with the network. The imaging devices 120 include copiers, scanners, thermal printers, laser printers and other devices adapted to produce or display an image. The access devices 130 include workstations, servers, terminals, personal computers and other devices adapted to provide an interface between a user and the network. One or more of the imaging devices 120 may be in communication with the network 110 through an access device 130, e.g., imaging device 120e coupled to the network 110 through the access device 130d.

The network 110 may be any computer or communication network designed to facilitate communication between imaging devices 120 and access devices 130. Examples of the network 110 include local area networks (LANs) and wide area networks (WANs), and may even include personal computer setups having one access device 130 in communication with one or more imaging devices 120. The network 110 may be a wired network, a wireless network or a hybrid network containing both wired and wireless devices.

The system 100 further includes one or more sensors 140 in communication with the network 110. The sensors 140 are adapted to detect the approach and presence of a potential user of one or more of the imaging devices 120 of the network 110. The sensors 140 may be in communication with the network 110 through an access device 130, e.g., sensor 140c coupled to the network 110 through the access device 130g.

For one embodiment, one or more of the sensors 140 is a facility access control device. Such devices are commonly used to control access to a facility, e.g., to limit access of a building to recognized employees of that building. Examples include readers for identification cards or other passes containing magnetic stripes or other magnetic media, detectors for transponders such as radio-frequency (RF) tags, scanners for identification cards or other passes containing barcodes or other machine-readable indicia, readers for identification cards or other passes containing machine-readable holographic images, electronic locks such as keypad entry locks, fingerprint scanners, retinal scanners and other devices used to provide authorization for entry or identification of an individual attempting to gain entry. Such sensors are preferred in that they are capable of providing some indication of an identity or authorization level of the person attempting to gain entry into a facility housing the system 100. While capable of identification, such sensors need not do so. For example, employees in a given building may be provided with access cards having the same embedded RF tag. However, the sensor would still indicate that an employee had authorization for entry despite not being able to identify which employee entered.

Other sensors 140 for use with the invention include motion detectors, sound detectors, pressure switches, magnetic switches, trip beams, proximity sensors and other sensors capable of detecting the presence or approach of a potential user of the system 100. Many of these sensors are of a type that may be found in a typical security system. Examples include mats with an embedded pressure switch to indicate when someone has stepped on the mat, doors with magnetic or pressure switches to indicate whether they are open or closed, and light beams detectors that trip when the beam is broken or obscured to indicate that something has passed through the beam. Note that a potential user of the system 100 need not be an actual user of the system 100 or even a person. For example, a motion sensor may detect an evening cleaning crew that has neither the authorization nor the ability to access the network 110. As another example, a magnetic switch may detect a door ajar even though no person has passed through the doorway. Thus, while such sensors can be used to detect the presence or approach of a potential user, "false alarms" may also occur. For this reason, the sensors 140 are preferably facility access control devices as they can facilitate increased accuracy of determining a likely user of the system 100.

The sensors 140 are associated with a location, preferably remote from a pertinent access device 130. The sensors 140 provide a signal to the management facility 135 through the network 110 indicative of a presence of a potential user. This signal may further be indicative of a location of the potential user. For example, each entrance to a facility housing a system 100 may have a sensor 140. A signal from a sensor 140 indicating the presence of a potential user could further be indicative of the associated entrance where the potential user was detected by nature of the signal providing source information, as is common in network communications, to indicate which sensor 140 detected the potential user. The signal may further have a time stamp indicating when the potential user was detected. Alternatively, the management facility 135 can associate a time of detection with the signal upon receipt.

The system 100 further includes a management facility 135 in communication with the network 110, the imaging devices and the sensors 140. The management facility 135 may further be in communication with access devices 130 in addition to a possible host device. The management facility 135 is a set of instructions to be performed by a computer processor. These computer-readable instructions are stored on a computer-usable media and may be in the form of either software, firmware or hardware. In a hardware solution, the instructions are hard coded as part of a processor, e.g., an application-specific integrated circuit (ASIC) chip. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable. For the embodiment depicted in FIG. 1, the management facility 135 resides on a computer-usable media of the access device 130a. However, the management facility 135 may reside on one or more of the devices of the network 110, including any of the access devices 130 and the imaging devices 120.

The management facility 135 is adapted to initialize one or more of the imaging devices 120. This can include sending a power-up signal to bring an imaging device 120 out of an off state or sending a wake-up signal to bring an imaging device 120 out of a stand-by state. Such may include sending a null print job to a printer, for example.

The management facility 135 begins the initialization process for an imaging device 120 in response to a predefined criteria. This predefined criteria may be simply the detection of a potential user. However, additional information and logic may be applied to determine whether the potential user is a likely user of an imaging device 120 of the system 100. One example includes a length of time following detection of the potential user. Consider the case where an employee gains entry to their office by swiping an ID card through a magnetic card reader and it is expected that this employee will take ten minutes in travel time and login time before they can gain access to their network. Thus, while the employee is a potential user of an imaging device when they gain entry to their office, they are not a likely user of the imaging device for at least ten minutes. If the expected initialization time of an imaging device used by the employee is six minutes, the initialization can be delayed by four minutes without creating any expected delay to the employee. This time delay may be dependent upon a location of where the potential user was detected relative to a location of the imaging device or to a location of an access device associated with the user. This time delay may further be dependent upon an expected initialization time of each imaging device.

Determining whether a potential user is a likely user may further take into account such things as past behavior of the potential user. While incorporating past behavior is best accomplished using sensors 140 providing an indication of the identity of the potential user, it is conceivable to incorporate past behavior using sensors 140 that do not have this capability. For example, any detection of a potential user by a single sensor or group of sensors can be considered to be the same user.

Past behaviors of a potential user include such items as an average time delay between detecting the approach of the potential user and actual use of an imaging device by that user; the potential user can be considered a likely user after passage of this average time delay. Another past behavior may include an occurrence rate of uses of an imaging device per approach of the potential user; the potential user may be considered to be a likely user only if the occurrence rate of uses is above some threshold amount. Another past behavior may include an occurrence rate of approaches of the potential user; a potential user may be considered to be a likely user only if the occurrence rate of approaches is above some threshold amount. Another past behavior may include a behavior of the potential user associated with a particular day or time of day when the user is detected; a potential user may be considered to be a likely user when approach is detected on a normal work day or during normal work hours, but the potential user may be considered not to be a likely user when approach is detected on other than a normal work day or normal work hours as such approach would not be expected.

The predefined criteria may further consider other indications of a likelihood that a potential user might desire to use an imaging device. For example, the user, or more likely, a network administrator, can set the criteria such that the user can never be considered a likely user for purposes of remotely triggering an initialization process of any imaging device 120 of the system 100 or some subset of the imaging devices 120, even though the user may be authorized to use and capable of using the imaging devices 120. As a further example, the criteria may consider what other potential users have been detected, e.g., an office assistant may be considered to be a likely user for purposes of triggering an initialization process only if their manager has also been detected. Other indications of a likelihood that a potential user might desire to use an imaging device is whether the user has been set up or authorized to use the imaging device, a location of where the potential user was detected relative to a location of an imaging device 120 or access device 130 associated with the user. For example, detecting a potential user at an entrance other than an expected entrance may indicate that the user is not expecting to utilize an imaging device.

Figure 2:
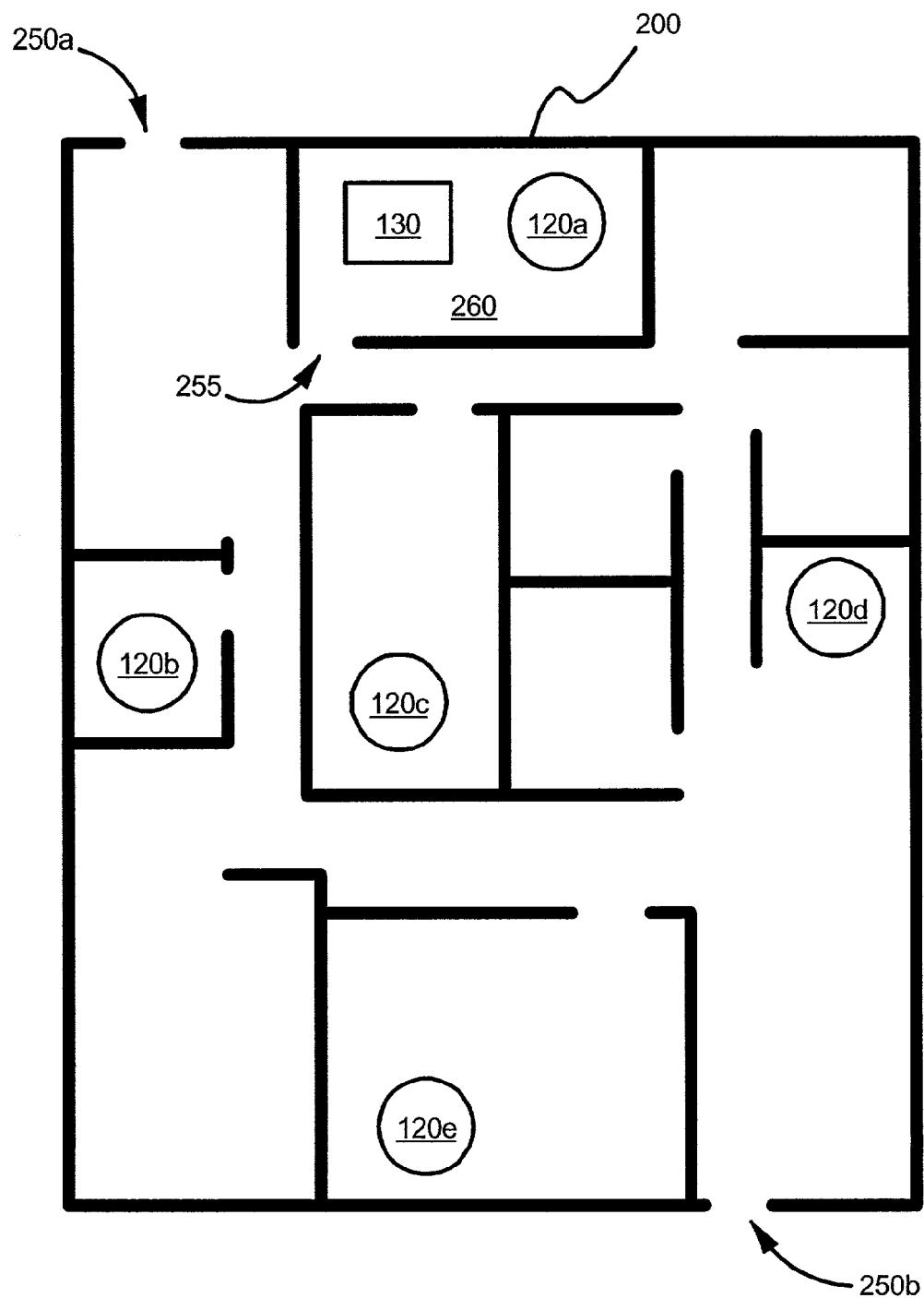
FIG. 2 is a map of a facility housing a network of imaging devices and access devices in accordance with an embodiment of the invention.

FIG. 2 is a map of a facility 200 housing one or more imaging devices 120 and at least one access device 130. The facility 200 includes one or more external entrances 250. The facility 200 may further include an internal entrance 255 to an area 260 containing an access device 130 associated with a potential user of one or more of the imaging devices 120. It is preferable to place sensors 140 (not shown in FIG. 2) at entrances 250 or 255 of a facility 200, although it is not required to do so.

Each user may be associated with one or more of the imaging devices 120 for purposes of remotely triggering an initialization process. For example, a first user may be associated with imaging devices 120*a* and 120*c* while a second user may be associated with imaging devices 120*b* and 120*e*. Note that a user may have access to more imaging devices than are associated for purposes of remotely triggering an initialization process. For example, the first user may be capable of using imaging device 120*d* without having the ability to remotely trigger an initialization process of this imaging device.

Consider the example of a potential user associated with the access device 130 and imaging devices 120*a* and 120*c* in FIG. 2. If the potential user is detected at entrance 250*a*, they may be considered to be a likely user of the imaging devices due to their proximity to their associated access device. Contrarily, the potential user may be considered not to be a likely user of the imaging devices if detected at the entrance 250*b* unless the potential user is subsequently detected at the entrance 255. Alternatively, the potential user may be considered not to be a likely user of the imaging devices until detected at the internal entrance 255 regardless of which external entrance 250 they used to enter the facility 200. When the potential user is determined to be a likely user of its associated imaging devices 120, the management facility 135 (not shown in FIG. 2) provides a signal directed to the associated imaging devices 120 and adapted to begin the initialization process for the respective imaging devices 120. Note that the determination of whether a potential user is a likely user may be independent for each associated imaging device 120. For example, based on past behaviors of the user or characteristics of the imaging devices, initialization of the imaging device 120*a* may be started at a time different from an initialization of the imaging device 120*c*.

In addition to the use of sensors to detect the presence of a potential user, other actions can generate signals indicative of the presence of the user. For example, the boot-up of an access device or the entry of a network logon sequence at the access device may be indicative of the presence of a potential user. In each case, the action can indicate the presence of the potential user before the user is able to or likely to access an imaging device.

CONCLUSION

Methods and apparatus for initializing imaging devices in response to a remote event have been described herein. Detection of a potential user of an imaging device is utilized to begin the device initialization prior to when the user might be expected to access the imaging device. By beginning the initialization process prior to the user's expected access of the device, wait time experienced by the user may be reduced without a need to continuously maintain the device in a full powered-up state or even to maintain the device in a stand-by state.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of preparing an imaging device for use, comprising:
   remotely detecting a potential user of the imaging device;
   determining whether the potential user of the imaging device is a likely user of the imaging device in response to remotely detecting the potential user; and
   beginning an initialization of the imaging device in response, at least in part, to remotely detecting the potential user and determining that the potential user is a likely user of the imaging device.

2. The method of claim 1, wherein detecting a potential user of the imaging device comprises detecting that a person has entered a facility housing the imaging device.

3. A method of preparing an imaging device for use, comprising:
   detecting a potential user of the imaging device; and
   beginning an initialization of the imaging device in response, at least in part, to detecting the potential user;
   wherein detecting a potential user of the imaging device comprises detecting that a person has entered a facility housing the imaging device; and
   wherein detecting a potential user of the imaging device further comprises determining an identity of the person who entered the facility and deciding whether the person is a potential user based on their identity.

4. The method of claim 1, further comprising:
   beginning the initialization of the imaging device only when the potential user of the imaging device is a likely user of the imaging device.

5. The method of claim 4, wherein a potential user of the imaging device is a likely user of the imaging device after a predetermined time delay from detecting the approach of the potential user.

6. The method of claim 5, wherein the predetermined time delay is dependent upon a location of where the potential user was detected relative to a location of the imaging device or to a location of an access device associated with the potential user.

7. The method of claim 4, wherein a potential user of the imaging device cannot be a likely user of the imaging device unless detection of the potential user of the imaging device was expected.

8. A method of preparing an imaging device for use, comprising:
   detecting a potential user of the imaging device;
   determining whether the potential user of the imaging device is a likely user of the imaging device; and
   beginning an initialization of the imaging device in response, at least in part, to detecting the potential user, and only when the potential user of the imaging device is a likely user of the imaging device;
   wherein determining whether the potential user of the imaging device is a likely user of the imaging device further comprises evaluating past behaviors of the potential user.

9. The method of claim 8, wherein past behaviors include at least one behavior selected from the group consisting of an average time delay between detecting the potential user and use of the imaging device by the potential user; an occurrence rate of uses of the imaging device per detection of the potential user; an occurrence rate of detections of the potential user; a behavior of the potential user associated with a particular day corresponding to the day of detecting the potential user; and a behavior of the potential user associated with a particular time of day corresponding to the time of day of detecting the potential user.

10. A method of preparing an imaging device for use, comprising:
    detecting a potential user of the imaging device;
    determining whether the potential user of the imaging device is a likely user of the imaging device; and
    beginning an initialization of the imaging device in response, at least in part, to detecting the potential user, and only when the potential user of the imaging device is a likely user of the imaging device;
    wherein determining whether the potential user of the imaging device is a likely user of the imaging device further comprises determining whether detection of the potential user was expected.

11. A system, comprising:
    a network;
    at least one imaging device in communication with the network;
    at least one sensor in communication with the network and adapted to detect a potential user of one or more of the imaging devices; and
    a management facility in communication with the network, the at least one imaging device and the at least one sensor;
    wherein the management facility is adapted to initialize one or more of the imaging devices in response to a predefined criteria;
    wherein the predefined criteria comprises at least whether a sensor indicates detection of a potential user; and
    wherein the predefined criteria further comprises an indication of a likelihood that the potential user might desire to use one or more of the imaging devices prior to the potential user accessing the network or any of the imaging devices.

12. The system of claim 11, wherein the at least one sensor composes at least one sensor selected from the group consisting of a facility access control device, a motion detector, a pressure switch, a magnetic switch, a trip beam, and a proximity sensor.

13. The system of claim 12, wherein the facility access control device is selected from the group consisting of a magnetic media reader, a holographic reader, a transponder detector, a barcode scanner, a fingerprint scanner and a retinal scanner.

14. The system of claim 11, wherein the predefined criteria further comprises a length of time after a sensor indicates detection of a potential user.

15. The system of claim 14, wherein the length of time is dependent upon which sensor indicated detection of a potential user.

16. The system of claim 11, wherein the indication of a likelihood that the potential user might desire to use the imaging device includes at least one indication selected from the group consisting of a past behavior of the potential user; a day of the week that the sensor indicated detection of the potential user; an identity of the potential user; a location of the sensor indicating detection of the potential user relative to a location of an imaging device to be initialized; a location of the sensor indicating detection of the potential user relative to a location of an access device associated with the potential user; and an identity of other potential users already detected.

17. A computer-usable media having computer-readable instructions stored thereon capable of causing a processor to perform a method, the method comprising:

receiving a first signal indicative of a presence of a potential user of an imaging device;

determining whether the potential user of the imaging device is a likely user of the imaging device in response to receiving the first signal; and providing a second signal directed to the imaging device and adapted to begin an initialization of the imaging device if it is determined that the potential user is a likely user.

18. The computer-usable media of claim 17, wherein, in the method, the first signal is further indicative of a location of the potential user when the presence of the potential user was detected.

19. The computer-usable media of claim 17, wherein, in the method, the first signal is further indicative of a time when the presence of the potential user was detected.

* * * * *

UNITED STATES PATENT AND TRADEMARK OFFICE
CERTIFICATE OF CORRECTION

PATENT NO.       : 7,142,122 B2                                     Page 1 of 1
APPLICATION NO.  : 09/992180
DATED            : November 28, 2006
INVENTOR(S)      : Chet Butikofer et al.

It is certified that error appears in the above-identified patent and that said Letters Patent is hereby corrected as shown below:

In column 8, line 38, in Claim 12, delete "composes" and insert -- comprises --, therefor.

Signed and Sealed this

Twelfth Day of May, 2009

JOHN DOLL
*Acting Director of the United States Patent and Trademark Office*